Sept. 2, 1958  O. P. ADAMS  2,849,878
APPARATUS FOR TESTING TUBULAR MEMBERS
Filed Nov. 23, 1955  2 Sheets-Sheet 1
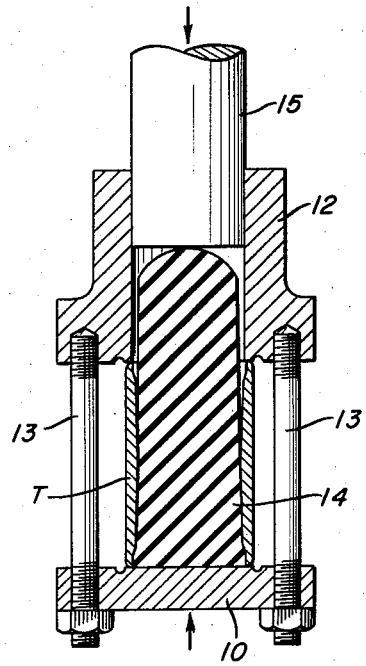
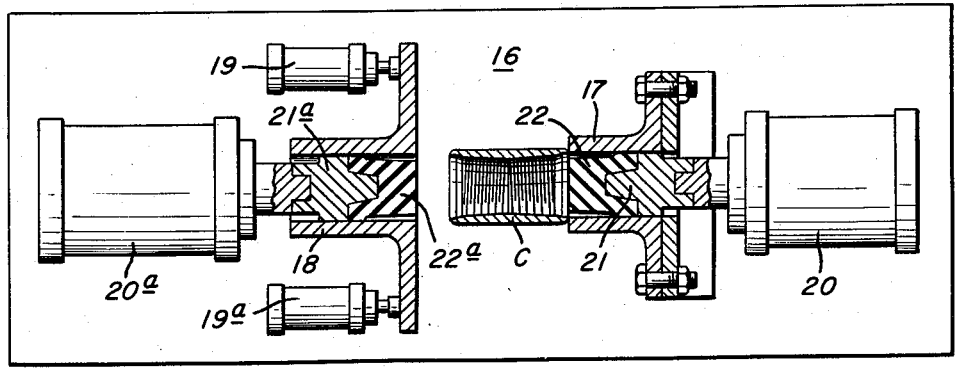
INVENTOR:
ORLANDO P. ADAMS,
BY: Donald G. Dalton
his Attorney.

Sept. 2, 1958     O. P. ADAMS     2,849,878
APPARATUS FOR TESTING TUBULAR MEMBERS Filed Nov. 23, 1955     2 Sheets-Sheet 2

INVENTOR:
ORLANDO P. ADAMS,
BY: Donald G. Dalton
his Attorney.

United States Patent Office 2,849,878
Patented Sept. 2, 1958

2,849,878

APPARATUS FOR TESTING TUBULAR MEMBERS

Orlando P. Adams, Bay St. Louis, Miss., assignor to United States Steel Corporation, a corporation of New Jersey Application November 23, 1955, Serial No. 548,637

3 Claims. (Cl. 73—88)

This invention relates to an improved apparatus for high pressure internal testing of short length tubular pieces, such as pipe couplings or blanks therefor.

An object of the invention is to provide an improved apparatus for internally testing tubular pieces on a production line basis if desired, and yet eliminating need for a fluid medium to transmit pressure to the test piece and the accompanying handling and sealing problems.

A further object is to provide an improved testing apparatus which utilizes an elastomer, such as rubber, neoprene or other analogous synthetic, as a pressure transmitting medium.

A further object is to provide a testing apparatus which has the foregoing advantages and is operable with internally threaded test pieces, as well as unthreaded pieces.

In accomplishing these and other objects of the invention, I have provided improved details of structure, preferred forms of which are shown in the accompanying drawings, in which:

Figure 1 is a diagrammatic longitudinal section of a simplified form of testing apparatus constructed in accordance with my invention suitable for testing unthreaded pieces;

Figure 2 is a somewhat diagrammatic top plan view, partly in section, of a modified testing apparatus constructed in accordance with my invention, suitable for testing either threaded or unthreaded pieces, the parts being positioned for insertion or removal of a test piece.

Figure 3:
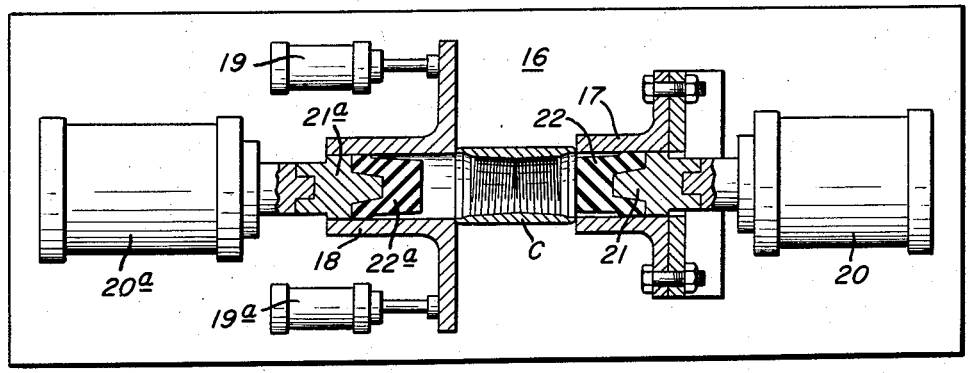
Figure 3 is a view similar to Figure 2, but with the test piece clamped and ready to undergo test.

The simplified form of my apparatus shown in Figure 1 comprises a jig which is formed of a base plate 10, a guide sleeve 12 and a plurality of connecting bolts 13. A tubular test piece T, which has no internal threads (for example a coupling blank), is clamped between the base plate and guide sleeve. Before the parts are clamped, a solid core 14 of rubber, neoprene or other equivalent synthetic is inserted within the test piece from the end which bears against the base plate. The portion of the core adjacent the base plate conforms approximately with this portion of the test piece bore. The other end of the core extends into the guide sleeve, which also contains a reciprocable piston 15 connected to any suitable pressure applying means, not shown. To apply test pressure to the test piece, the piston 15 is moved farther into the sleeve 12 so that it bears with increased force against the core 14. The latter acts as a pressure transmitting medium to apply pressure to the test piece internally thereof, while the base plate 10 opposes this pressure at the other end. It is essential only that the parts fit closely; that is, the ends of the test piece T must bear accurately against the base plate 10 and guide sleeve 12, the bore in the guide sleeve must conform closely with the adjacent end of that in the test piece, and the piston 15 must fit closely within the guide sleeve. The test piece is clamped with sufficient pressure to prevent extrusion of the core, but not to apply a substantial compressive load.

Figure 4:
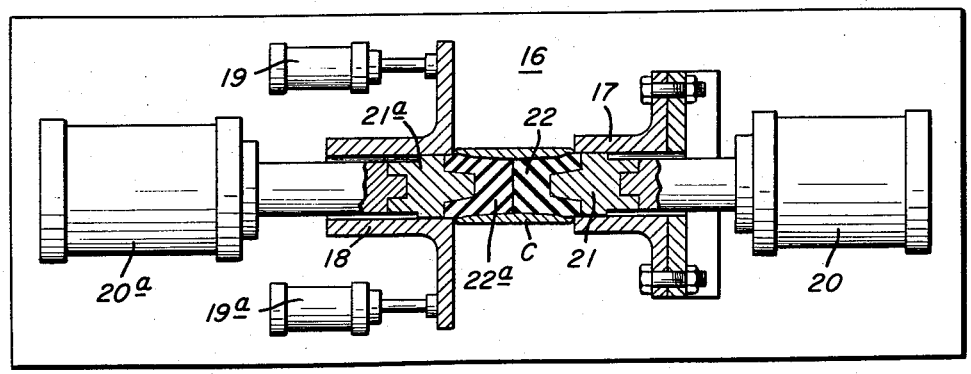
Figure 4 is another similar view, but with the test piece actually undergoing test.

The modified apparatus shown in Figures 2, 3 and 4 comprises a base 16 which carries fixed and movable guides 17 and 18. Each guide includes a mounting flange and a sleeve, the sleeves of the two guides being axially aligned. The base also carries a pair of double acting fluid pressure cylinders and pistons 19 and 19a connected to the flange of the movable guide 18 for operating this guide. A tubular test piece C, either threaded internally or unthreaded, is positioned with one end abutting the end of the sleeve of the fixed guide 17, as shown in Figure 2. Next the cylinders 19 and 19a are operated to position the end of the sleeve of the movable guide 18 against the other end of the test piece and clamp the test piece between the two guides, as shown in Figure 3, with sufficient pressure to prevent extrusion of the cores, but not to apply any substantial compressive load. The sleeve bores match the bore of the test piece at the abutting ends to furnish a substantially smooth internal cylindrical surface at the junctures. The guides can be removed and replaced to accommodate test pieces of different sizes.

The base 16 also carries a pair of double-acting opposed axially aligned fluid pressure cylinders and pistons 20 and 20a. The respective piston rods from these cylinders carry fittings 21 and 21a, which in turn carry solid elastomer cores 22 and 22a of rubber, neoprene, or other equivalent synthetic. The fittings and cores are slidably received in the respective guides 17 and 18. After the test piece C is clamped as shown in Figure 3, the cylinders 20 and 20a are operated to project the cores 22 and 22a into the test piece as shown in Figure 4. When the cores are thus projected, their end faces abut, and the cores are shaped so that together they substantially fill the test piece. In the example the test piece is symmetrical on opposite sides of a central transverse plane; hence the two cores are identically shaped. The cores can be removed and replaced to accommodate different sizes and shapes of test pieces. For convenience, the cores are shown bonded to the respective fittings 21 and 21a, which can be detached from the piston rods to change cores.

After the cores are projected into the test piece, additional pressure is applied to the cylinders 20 and 20a in equal amounts. This pressure acts in opposite directions on the cores which together act as a pressure transmitting medium to apply the pressure to the test piece internally thereof. When the latter is internally threaded, a portion of the pressure is utilized in expanding the cores to fill the threads. However, the pressure thus utilized is relatively constant for any set of cores and can be deducted from the total pressure applied to the cores to determine that actually sustained by the test piece. Relatively smooth junctures are required between the ends of the guides 17 and 18 and the test piece and a close fit is required between these guides and the fittings 16 and 16a to prevent extrusion of the core material. For an accurate test of a threaded test piece, I have found it necessary to insert cores from both ends of the piece, as shown in Figures 2, 3 and 4, rather than simply from one end as shown in Figure 1. At the conclusion of the test, the cylinders 20 and 20a are operated to withdraw the cores, which spring back to their original shape.

In actual tests I have installed strain gauges on the exterior of a test piece and applied pressure thereto both through the cores of the present invention and by hydrostatic means. I found that the stress-strain curves obtained by the two procedures are virtually identical, thus demonstrating that my method and apparatus furnish an accurate test. I have also found by actual experience that the cores can be used in excess of a thousand test cycles at 15,000 p. s. i. without serious deterioration.

While I have shown certain preferred embodiments of my apparatus, it is apparent further modifications may arise. For example, many mechanical variations are possible in the guides and their operating means. Therefore, I do not wish to be limited by the disclosure set forth, but only by the scope of the appended claims.

I claim:

1. A testing apparatus for a tubular test piece comprising a base, a first guide sleeve fixed to said base, a second guide sleeve mounted on said base in axial alignment with the first guide sleeve for movement toward and away from the first, said guide sleeves having bores both of the same diameter conforming with the ends of the bore in the test piece, fluid pressure means on said base connected with said second guide sleeve for moving it into engagement with a test piece abutting the first guide sleeve leaving the outside of the test piece exposed, a pair of opposed fluid pressure cylinders mounted on said base outside said guide sleeves at opposite ends thereof, reciprocable piston rods projecting from said cylinders into the respective guide sleeves, fittings carried by the respective piston rods and slidably received within the respective guide sleeves, and a pair of solid elastomer cores fixed to the respective fittings and adapted to be inserted into opposite ends of a test piece positioned between said guide sleeves, said fluid pressure means being adapted to apply sufficient pressure to said second guide sleeve to clamp the test piece as the test progresses to prevent extrusion of said cores at the planes of contact between the guide sleeves and test piece without applying any substantial compressive load to the test piece, said cylinders being adapted to apply equal and opposite compressive forces to said cores to stress the test piece.

2. A testing apparatus for a tubular test piece comprising a base, a pair of axially aligned relatively movable guides supported on said base, each of said guides including a sleeve adapted to abut an end of the piece and whose bore conforms with the end of the bore through the piece, a pair of opposed solid elastomer cores slidably received in the respective sleeves and adapted to be inserted into opposite ends of the piece and together substantially to fill the latter, and fluid pressure means mounted on said base for applying equal and opposite compressive forces to the respective cores to stress the piece, said sleeves remaining in contact with the end faces of said piece to prevent extrusion of said cores at the planes of contact.

3. A testing apparatus for a tubular test piece comprising a base, a pair of axially aligned relatively movable guides supported on said base, each of said guides including a sleeve adapted to abut an end of the piece and whose bore conforms with the end of the bore through the piece, guide operating means on said base for positioning the guides with respect to the piece, a pair of opposed solid elastomer cores slidably received in the respective sleeves and adapted to be inserted into opposite ends of the piece and together substantially to fill the latter, and fluid pressure cylinders mounted on said base and having pistons connected to the respective cores for applying equal and opposite compressive forces to the cores to stress the piece, said sleeves remaining in contact with the end faces of said piece to prevent extrusion of said cores at the planes of contact.

References Cited in the file of this patent

UNITED STATES PATENTS

| | | |
|---|---|---|
| 430,816 | Webster | June 24, 1890 |
| 1,034,426 | Crisandt | Aug. 6, 1912 |
| 1,041,406 | Bauroth | Oct. 15, 1912 |
| 1,613,150 | Zore | Jan. 4, 1927 |
| 2,684,590 | Lassman | July 27, 1954 |